(12) United States Patent
Poznanski et al.

(10) Patent No.: US 8,645,361 B2
(45) Date of Patent: Feb. 4, 2014

(54) USING POPULAR QUERIES TO DECIDE WHEN TO FEDERATE QUERIES

(75) Inventors: Victor Poznanski, Sammamish, WA (US); Yauhen Shnitko, Redmond, WA (US); Dmitriy Meyerzon, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/355,290

(22) Filed: Jan. 20, 2012

(65) Prior Publication Data

US 2013/0191371 A1 Jul. 25, 2013

(51) Int. Cl.
*G06F 17/30* (2006.01)

(52) U.S. Cl.
USPC .......................................... 707/722; 707/971

(58) Field of Classification Search
USPC ......... 707/759, 765, 769, 713, 758, 766, 780, 707/E17.062, E17.069, E17.074, E17.082, 707/E17.108, E17.128, E17.129, 999.005, 707/767, 971, 722, 723, 726, E17.08, 707/E17.014; 705/14.42, 14.43
See application file for complete search history.

(56) References Cited

U.S. PATENT DOCUMENTS

| | | | |
|---|---|---|---|
| 6,578,046 B2 | 6/2003 | Chang et al. | |
| 7,472,113 B1 | 12/2008 | Watson et al. | |
| 7,567,953 B2 | 7/2009 | Kadayam et al. | |
| 7,930,286 B2 | 4/2011 | Sue | |
| 2003/0014399 A1* | 1/2003 | Hansen et al. | 707/3 |
| 2008/0071742 A1* | 3/2008 | Yang et al. | 707/3 |
| 2008/0313147 A1* | 12/2008 | Svore et al. | 707/3 |
| 2009/0006332 A1 | 1/2009 | Mowatt et al. | |
| 2009/0055388 A1 | 2/2009 | Song et al. | |
| 2010/0023502 A1 | 1/2010 | Marlow | |
| 2010/0082752 A1* | 4/2010 | Donato et al. | 709/206 |
| 2010/0306213 A1* | 12/2010 | Taylor et al. | 707/759 |
| 2011/0258033 A1* | 10/2011 | Gollapudi et al. | 705/14.42 |
| 2011/0264673 A1* | 10/2011 | White et al. | 707/750 |
| 2012/0143789 A1* | 6/2012 | Wang et al. | 707/728 |
| 2012/0158685 A1* | 6/2012 | White et al. | 707/706 |
| 2013/0110827 A1* | 5/2013 | Nabar et al. | 707/728 |
| 2013/0179705 A1* | 7/2013 | Ananthakrishnan et al. | 713/300 |

OTHER PUBLICATIONS

Jeffrey Pound, Stelios Paparizos and Panayiotis Tsaparas—"Facet discovery for structured web search: a query-log mining approach"—Proceeding SIGMOD '11 Proceedings of the 2011 ACM SIGMOD International Conference on Management of data ACM Jun. 12-16, 2011, pp. 169-180.*

Arnab Nandi and Philip A. Bernstein—"HAMSTER: using search clicklogs for schema and taxonomy matching"—Proceedings of the VLDB Endowment VLDB Endowment Hompage archive, vol. 2 Issue 1, Aug. 2009—pp. 181-192.*

Pal, et al "Leveraging Query Associations in Federated Search", In Proceedings of the SIGIR 2008 Workshop on Aggregated Search, 2008, 9 pages.

* cited by examiner

*Primary Examiner* — Jean B Fleurantin
*Assistant Examiner* — Anh Ly
(74) *Attorney, Agent, or Firm* — Tom Wong; Doug Barker; Micky Minhas (57) ABSTRACT

A query received from a user is directed to a particular search application (e.g. an Enterprise search portal) that is associated with a result source from which to retrieve results. The received query may be federated to additional result sources when the received query is determined to be a popular query in a result source. Query logs associated with the additional result sources are analyzed to determine when a query is popular as compared to the original result source. The query may be altered before being executed that uses one or more of the additional result sources. When the query (altered/unaltered) is determined to be popular for any of the additional result sources as compared to the original result source, the query is executed using that additional result source.

20 Claims, 8 Drawing Sheets

USING POPULAR QUERIES TO DECIDE WHEN TO FEDERATE QUERIES

BACKGROUND

Many users enter queries using one or more search applications to retrieve results. For example, a user may use a people search application configured to find a person, a video search application to find videos, a music search application to find music, and the like. It can be difficult to select the search application that returns the best results.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A query received from a user is directed to a particular search application (e.g. an Enterprise search portal) that is associated with a result source from which to retrieve results. The received query may be federated to additional result sources when the received query is determined to be a popular query in a result source. For example, a query may be federated to an Internet search engine (e.g. Bing®), a people result source, a video result source, a different scope for the result source (e.g. Enterprise-wide or restricted to one or more result sources within the Enterprise) and the like, based on the received query's popularity within that additional result source and the original result source. Instead of an administrator having to manually maintain a list of queries to federate, a query is federated based on an automatic determination of the query's popularity in the additional result source(s) as compared to the original result source. Query logs associated with the additional result sources are analyzed to determine when a query is popular as compared to the original result source. The query may be altered before being executed that uses one or more of the additional result sources. When the query (altered/unaltered) is determined to be popular for any of the additional result sources as compared to the original result source, the query is executed using that additional result source. After the results from the execution of the query against the original result source and the additional result sources are obtained, the top N (e.g. 2) results from each result source are ranked (e.g. as a block) against the background results of the original result source.

DETAILED DESCRIPTION

Referring now to the drawings, in which like numerals represent like elements, various embodiments will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Figure 1:
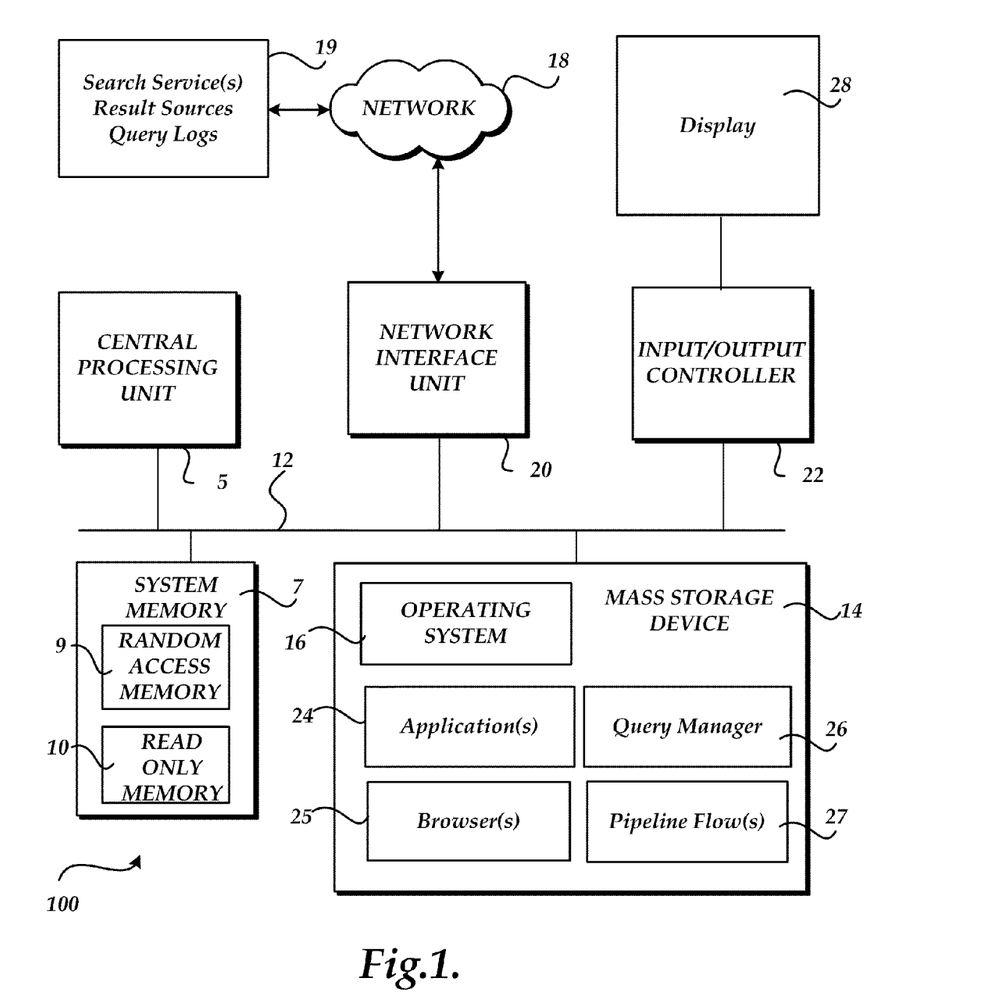
FIG. 1 illustrates an exemplary computing device.

Referring now to FIG. 1, an illustrative computer architecture for a computer 100 utilized in the various embodiments will be described. The computer architecture shown in FIG. 1 may be configured as a server computing device, a desktop computing device, a mobile computing device (e.g. smartphone, notebook, tablet . . . ) and includes a central processing unit 5 ("CPU"), a system memory 7, including a random access memory 9 ("RAM") and a read-only memory 10 ("ROM"), and a system bus 12 that couples the memory to the central processing unit ("CPU") 5.

A basic input/output system containing the basic routines that help to transfer information between elements within the computer, such as during startup, is stored in the ROM 10. The computer 100 further includes a mass storage device 14 for storing an operating system 16, application(s) 24, pipeline flows 27, and other program modules, such as Web browser 25, and query manager 26 which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

According to various embodiments, computer 100 may operate in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, such as a touch input device. The touch input device may utilize any technology that allows single/multi-touch input to be recognized (touching/non-touching). For example, the technologies may include, but are not limited to: heat, finger pressure, high capture rate cameras, infrared light, optic capture, tuned electromagnetic induction, ultrasonic receivers, transducer microphones, laser rangefinders, shadow capture, and the like. According to an embodiment, the touch input device may be configured to detect near-touches (i.e. within some distance of the touch input device but not physically touching the touch input device). The touch input device may also act as a display 28. The input/output controller 22 may also provide output to one or more display screens, a printer, or other type of output device.

A camera and/or some other sensing device may be operative to record one or more users and capture motions and/or gestures made by users of a computing device. Sensing device may be further operative to capture spoken words, such as by a microphone and/or capture other inputs from a user such as by a keyboard and/or mouse (not pictured). The sensing device may comprise any motion detection device capable of detecting the movement of a user. For example, a camera may comprise a MICROSOFT KINECT® motion capture device comprising a plurality of cameras and a plurality of microphones.

Embodiments of the invention may be practiced via a system-on-a-chip (SOC) where each or many of the components/processes illustrated in the FIGURES may be integrated onto a single integrated circuit. Such a SOC device may include one or more processing units, graphics units, communications units, system virtualization units and various application functionality all of which are integrated (or "burned") onto the chip substrate as a single integrated circuit. When operating via a SOC, all/some of the functionality, described herein, may be integrated with other components of the computer 100 on the single integrated circuit (chip).

As mentioned briefly above, a number of program modules and data files may be stored in the mass storage device 14 and RAM 9 of the computer 100, including an operating system 16 suitable for controlling the operation of a networked computer, such as the WINDOWS SERVER®, WINDOWS 7® operating systems from MICROSOFT CORPORATION of Redmond, Wash.

The mass storage device 14 and RAM 9 may also store one or more program modules. In particular, the mass storage device 14 and the RAM 9 may store one or more applications 24, such as a query manager 26, productivity applications (e.g. a content management application such MICROSOFT SHAREPOINT), and may store one or more Web browsers 25. The Web browser 25 is operative to request, receive, render, and provide interactivity with electronic documents, such as a Web page. According to an embodiment, the Web browser comprises the INTERNET EXPLORER Web browser application program from MICROSOFT CORPORATION.

Query manager 26 is configured to receive a query from a user that is directed to a particular search application (e.g. an Enterprise search portal) that is associated with a result source. The received query may be federated to additional result sources (e.g. result sources 19) and/or search applications/services (e.g. search service 19) when the received query is determined to be a popular query in the additional result source. For example, a query may be federated to an Internet search engine (e.g. Bing®), a people result source, a video result source, a different scope for the result source (e.g. Enterprise-wide or restricted to one or more result sources within the Enterprise) and the like, based on the received query's popularity within that additional result source and the original result source. Instead of an administrator having to manually maintain a list of queries to federate, a query is federated based on an automatic determination of the query's popularity in the additional result source(s) as compared to the original result source. Query logs associated with the additional result sources are analyzed to determine when a query is popular. The query may be altered for one or more of the additional result sources. When the query (altered/unaltered) is determined to be popular for any of the additional result sources as compared to the original result source, the query is executed using that additional result source. After the results from the execution of the query against the original result source and the additional result sources are obtained, the top N (e.g. 2) results from each result source are ranked (e.g. as a block) against the background results of the original result source.

Query manager 26 may be configured as an application and/or as part of a cloud based multi-tenant service that provides reresult sources (e.g. services, data . . . ) to different tenants (e.g. MICROSOFT OFFICE 365, MICROSOFT SHAREPOINT ONLINE). Additional details regarding the operation of query manager 26 will be provided below.

Figure 2:
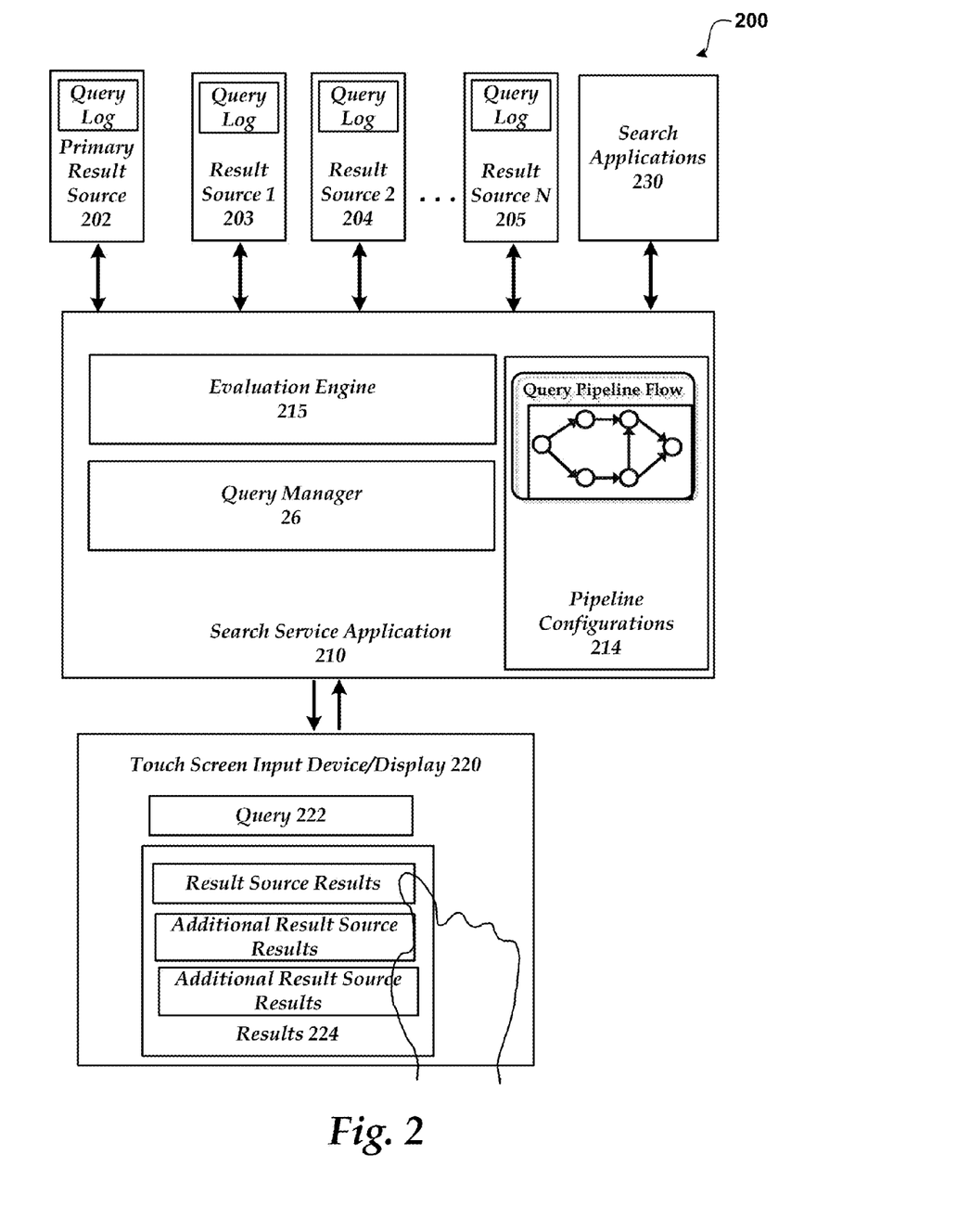
FIG. 2 illustrates an exemplary system for federating a search query to additional result sources.

FIG. 2 illustrates an exemplary system for federating a search query to additional result sources. As illustrated, system 200 includes search service application 210, query manager 26, evaluation engine 215, pipeline configurations 214, primary result source 202, result sources 1-N (203-205), search applications 230 and touch screen input device/display 220. Search service application 210 may be a part of another system (e.g. a cloud based and/or enterprise based application such as MICROSOFT SHAREPOINT) or a separate application/service.

Touch input system 200 as illustrated comprises a touch screen input device/display 220 that detects when a touch input has been received (e.g. a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

As illustrated, touch screen input device/display 220 shows an exemplary UI display for entering a query and displaying search results obtained from one or more result sources (e.g. result sources 1-N). Query manager 26 is configured to receive input from a user (e.g. using touch-sensitive input device 202 and/or keyboard input (e.g. a physical keyboard and/or SIP)) for interacting with a search service. For example, query manager 26 may receive touch input 224 that specifies a query 222.

The query manager 26 may be stored at one or more locations and may be accessed from one or more different locations. For example, a user may access a cloud-based query manager using a web browser, using a locally installed query manager that is configured to communicate with the search service application, and/or a combination of a cloud based service and an installed query manager.

Different pipeline configurations may be used by a search service application. According to an embodiment, the user may configure a set of condition-action rules over queries that may specify rule conditions and contextual information to which the rules apply. Rule conditions are a predicate over a query and some contextual information such as settings, and the like. Rule actions, which are taken when the predicate is true, may transform the query and/or generate parallel queries that are transformed versions of the original query. The user may configure a set conditional rules over the search results. Each rule's condition is a predicate over the properties of a search result. The rule search conditional rules specify when the rule triggers.

Query manager 26 may be configured to communicate with evaluation engine 215 for processing a query through the pipeline. Pipeline configurations 214 store different pipelines that may be used when processing queries. Generally, processing a query includes preparing the context, evaluating the rules, executing the queries, and preparing results.

Query rules may be configured to perform different actions. For example, a query rule may specify how to alter a query (e.g. add a term, delete a term), what result source(s) to check for possible execution of the query, create and display a result block, change/replace the query, assign a best bet to the query, and the like. Other actions may be defined.

Assigning best bets to a query customize the search results that are returned. For example, best bets may be used to obtain additional results, promote results, and the like.

Result blocks specify how to transform the original query to obtain a set of related results. The result blocks may specify a template that defines how to display the results in a block. The result blocks may also specify a different result result source, for which results are not normally available to the user. Result blocks may be displayed at a variety of different locations (e.g. shown above/below the core results, inserted within the core results, and the like).

Altering/changing the query includes specifying and/or applying a query transformation that is applied to the original query 222. The query transforms may provide a variety of transformations to a query. For example, one of the transformations may specify to use an additional/different result result source. The additional result sources may be associated with another search application (e.g. Internet search, such as MICROSOFT BING), a people search, a video search, a music search, a product search, a people search, enterprise search applications, and the like. The query transform may also specify to add/delete words from a query to help disambiguate results from a result source, specify a different ranking model, and other variations of query properties.

For example, if the primary result source 202 is a corporate portal, and another result source (e.g. one of result source 1-N) is an Internet search engine (e.g. BING, or another internet engine), the query may be altered to disambiguate the Internet search engine query. For example, adding a word to the user's original query narrows the results returned by the Internet search engine. In this way, queries that would be too general in the internet context, become more specific. For example, if a user types 'office' in a Microsoft internal company portal they likely want to download the MICROSOFT OFFICE suite of applications, or look at a team site for the current status of the upcoming release. Submitting the unaltered query "office" using an internet result source would retrieve results from the TV show, which is irrelevant to the results the user wants to obtain. By altering the query and adding the additional query term "Microsoft" to the query, the Internet search engine would retrieve more relevant results. The broader the search application, the more likely query alteration is beneficial. Generally, query alteration implies adding an additional query term (or phrase at the beginning or end of the query. Possibly, both forms of alteration occur in the query log.

Query logs are used to store information that is associated with queries. Each of the query logs may comprise the same information or different information. According to an embodiment, each of the query logs store information comprising the query, query parameters, user, session, rendered links relating to the query, and user interaction with the returned results. Each search application that is associated with the different result sources may be configured to store query information within a query log each time a query is executed using the search application. According to an embodiment, each query in the query log identifies the search application executing the query.

When a query log is associated with an external search application, the query manager 26 may be configured to import the raw query log (including the clicks) for the external search application or importing the head queries with their frequencies. The import is performed periodically (e.g. daily or weekly).

Periodically (e.g. once a day, twice a day), the click logs are analyzed by query manager 26 to compute frequencies of each query and counts of how many times each query was issued and how many times each query had a resulting click by the user (many clicks indicate a successful query). The query logs may be sorted by query click frequency in descending order and partitioned into the head and tail, such as by percentage of most frequent queries (20% of most frequent queries that covers 80% of overall query traffic, or by query count that covers approximately 20% of queries). The separation between head/tail may be adjusted based on the size of the query log to optimize performance Query manager 26 is configured to determine when to federate a query (e.g. query 222) to one or more additional result sources (e.g. result sources 1-N) in addition to the primary result source 202 that is associated with the search application which the user is currently accessing. Query manager 26 determines when a query (e.g. query 222) is popular in another result source (e.g. result sources 1-N) by comparing probabilities of the query occurring in each of the result sources that are associated with one or more search applications. When the fraction of probabilities of the query occurring between the primary result source 202 and an additional result source is higher than a threshold, the query is executed using the additional result source. According to an embodiment, the probability of the query is computed by dividing the query frequency in the corresponding result source by the size of its query log. Since the probabilities can be very small, the comparison may be done between logs of probabilities. In this case, the difference between the logs of probabilities is computed instead of computing a fraction between the probabilities.

When the query is altered, then two thresholds may be used in determining when to use the additional result source. A first threshold (e.g. an unaltered query threshold) for the unaltered query and a second threshold (e.g. an altered query threshold) for the altered query. According to an embodiment, the second threshold for the altered query is set to a smaller threshold to trigger since it is likely to be more accurate than the original query. Query manager 26 checks to see if the probability of the altered query exceeds the altered query threshold. When the altered query does not exceed the altered query threshold, the probability of the original query is checked using the unaltered query threshold. When the altered query exceeds the altered query threshold, then the additional result source has the altered query executed against it. This helps to ensure that the additional result source has queries executed against it that are already popular in that result source, and therefore are most likely to bring relevant results. The results that are returned by the additional result source(s) may also be used to determine when to use an additional result source. For example, many result sources may have editorial results configured for certain queries, such as best bets, or instant answers that may be used. Query manager 26 use check that the results include a high quality editorial result or not, and if so, use a lower threshold to trigger the query rule that uses the addition result source.

Figure 3:
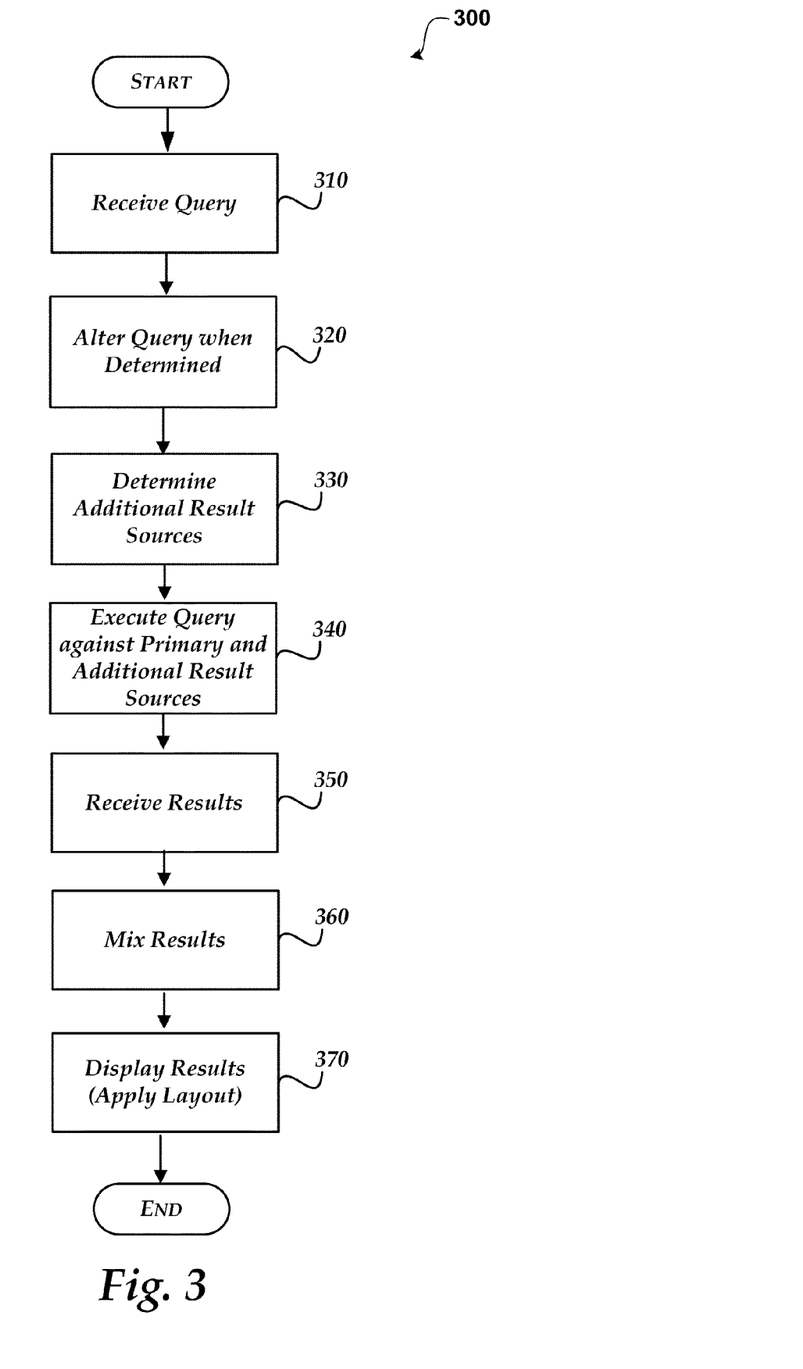
FIG. 3 illustrates an overview of federating a query based on a popularity of a query.
Figure 4:
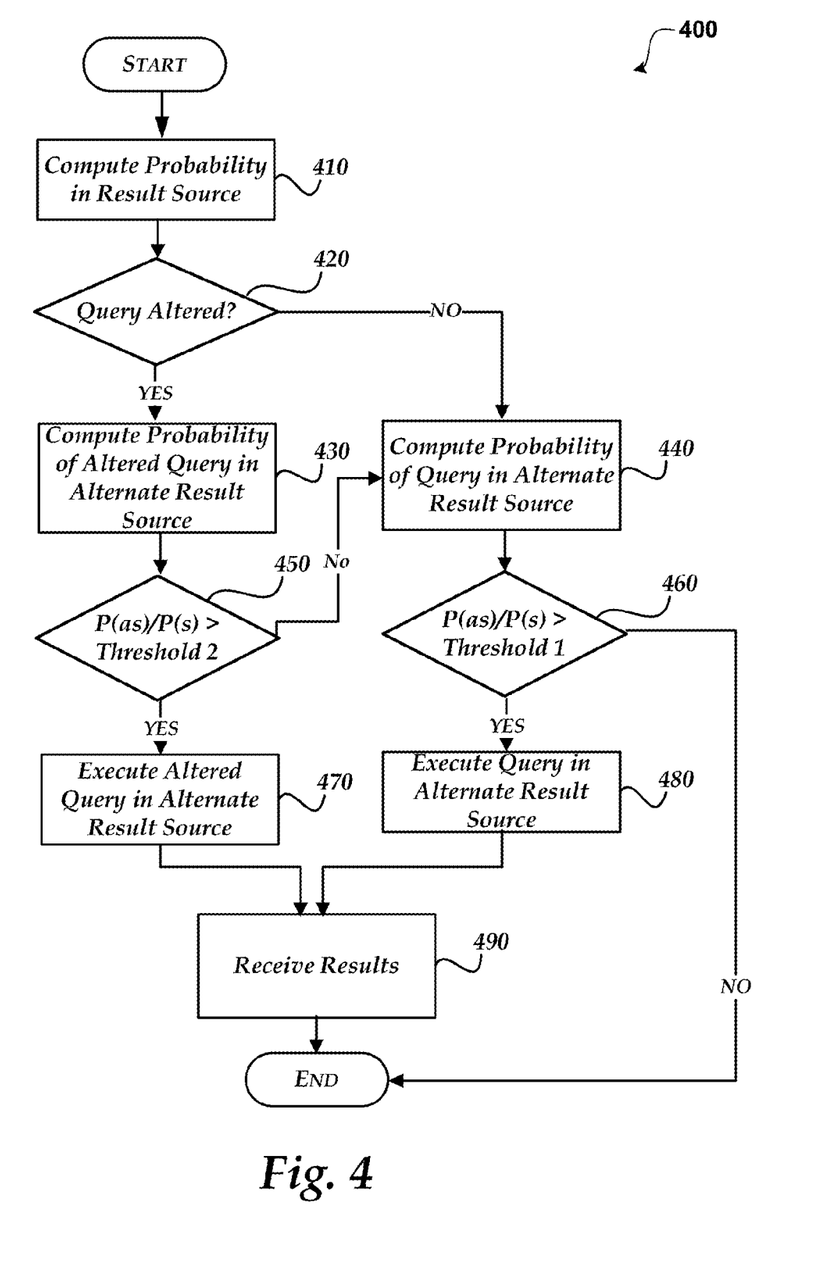
FIG. 4 shows a process for determining a popularity of a query for a primary result source and an alternate result source.

FIGS. 3-4 show illustrative processes related to federating a query to execute against additional result sources. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof While the operations are shown in a particular order, the ordering of the operations may be changed.

FIG. 3 illustrates an overview of federating a query based on a popularity of a query.

After a start operation, the process 300 flows to operation 310, where a search query is received. The query may be entered by a user within a search box and/or obtained using some other method. For example, a user may enter a query within an enterprise search application that is associated with the user's place of employment. The search application is configured to executes the query against a primary result source that is associated with the search application.

Moving to operation 320, the query is altered when determined Altering the query can transform the query and/or generate parallel queries that are transformed versions of the original query. The query is altered to change a scope of the query. For example, as described above, changing a scope of the query may result in results being returned to the user that more closely meet the user's expectations. The query may be altered before it is executed and checked for popularity against a result source. For example, one or more words may be added to a query before determining a popularity of the query. The context of the query may be used in determining when to alter a query. For example, the context may refer to a type of search being performed, a company associated with the user, and/or other information that may be used to alter the query.

Flowing to operation 330, any additional result source(s) to which the query (altered and/or unaltered) is to be executed against are determined. Generally, an additional result source is determined to be used when the popularity of a query (altered and/or unaltered) exceeds a predetermined threshold (See FIG. 4 and related discussion).

Transitioning to operation 340, the query that is either altered or remains unaltered for each of the determined result sources are executed.

Moving to operation 350, the results from each of the fired queries against the primary result source and each of the determined alternate result sources is received. The results may be returned in one or more formats. For example, a first search application may return search results in a first format, whereas another search provider returns results in another format.

Transitioning to operation 360, the returned results from each of the queries are mixed and/or ranked. According to an embodiment, the results from each generated query are put in a block, and these blocks are interleaved amongst the results of the original query. The blocks which are displayed, their order, and their location within the result list may be determined manually/automatically. For example, a user may specify how the results are displayed and/or the display of the results may be determined through machine learning. According to an embodiment, results from each of the determined alternate result sources are stored in different user blocks. The results from all/portion of the determined alternate result sources may also be interleaved such that the results are comingled with each other.

Moving to operation 370, the results are displayed. The mixed results may be evaluated against rules configured by the user. When a rule is located whose condition matches the result, the corresponding display layout is applied to that result.

The process then moves to an end operation and returns to processing other actions.

FIG. 4 shows a process 400 for determining a popularity of a query for a primary result source and an alternate result source.

After a start operation, the process flows to operation 410, where a probability of the query in the primary result source is determined As discussed herein, the probability of the query is computed by dividing the frequency of the occurrence of the query in the primary result source by the size of the result source's query log.

Moving to decision operation 420, a determination is made as to whether the query has been altered before determining a probability in an alternate result source. When the query has been altered, the process flows to operation 430. When the query has not been altered, the process flows to operation 440.

At operation 430, the probability of the occurrence of the altered query in the alternate result source is computed.

Flowing to decision operation 450, a determination is made as to whether the probability of the altered query divided by the probability of the query in the primary result source exceeds a predetermined altered query threshold. According to an embodiment, the predetermined altered query threshold is set to a lower threshold as compared to the unaltered query threshold. When the probability exceeds the altered query threshold, the process flows to operation 470. When the probability does not exceed the altered query threshold, the process flows to operation 440.

Transitioning to operation 470, the altered query is executed against the alternate result source.

At operation 440, the probability of the occurrence of the unaltered query in the alternate result source is computed.

Flowing to decision operation 460, a determination is made as to whether the probability of the unaltered query divided by the probability of the query in the primary result source exceeds a predetermined unaltered query threshold. According to an embodiment, the predetermined unaltered query threshold is set to a higher threshold as compared to the altered query threshold. When the probability exceeds the unaltered query threshold, the process flows to operation 480. When the probability does not exceed the altered query threshold, the process flows to and end operation and the alternate result source is not used.

Transitioning to operation 480, the unaltered query is executed against the alternate result source.

Flowing to operation 490, the results are received.

The process then moves to an end operation and returns to processing other actions.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
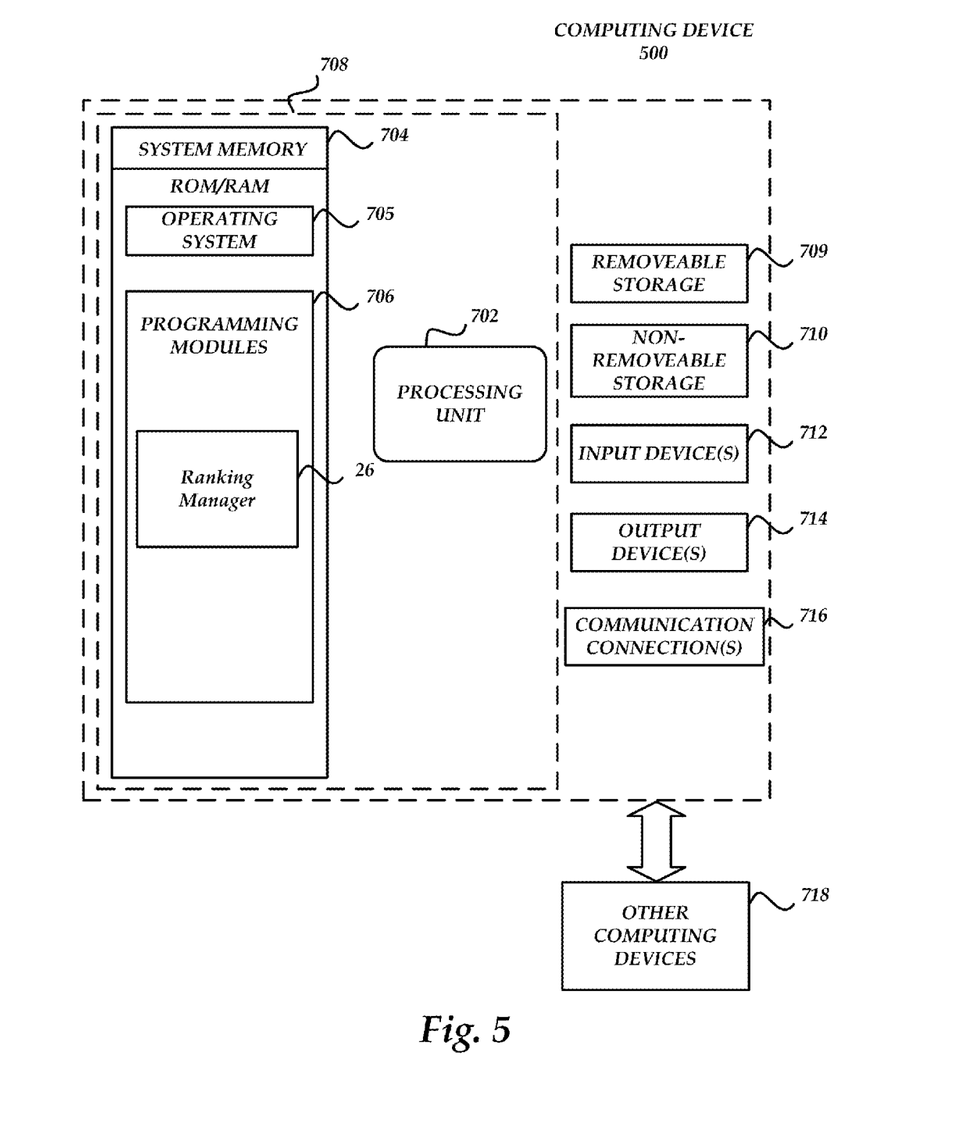
FIGS. 5-7 and the associated descriptions provide a discussion of a variety of operating environments in which embodiments of the invention may be practiced.
Figure 6A:
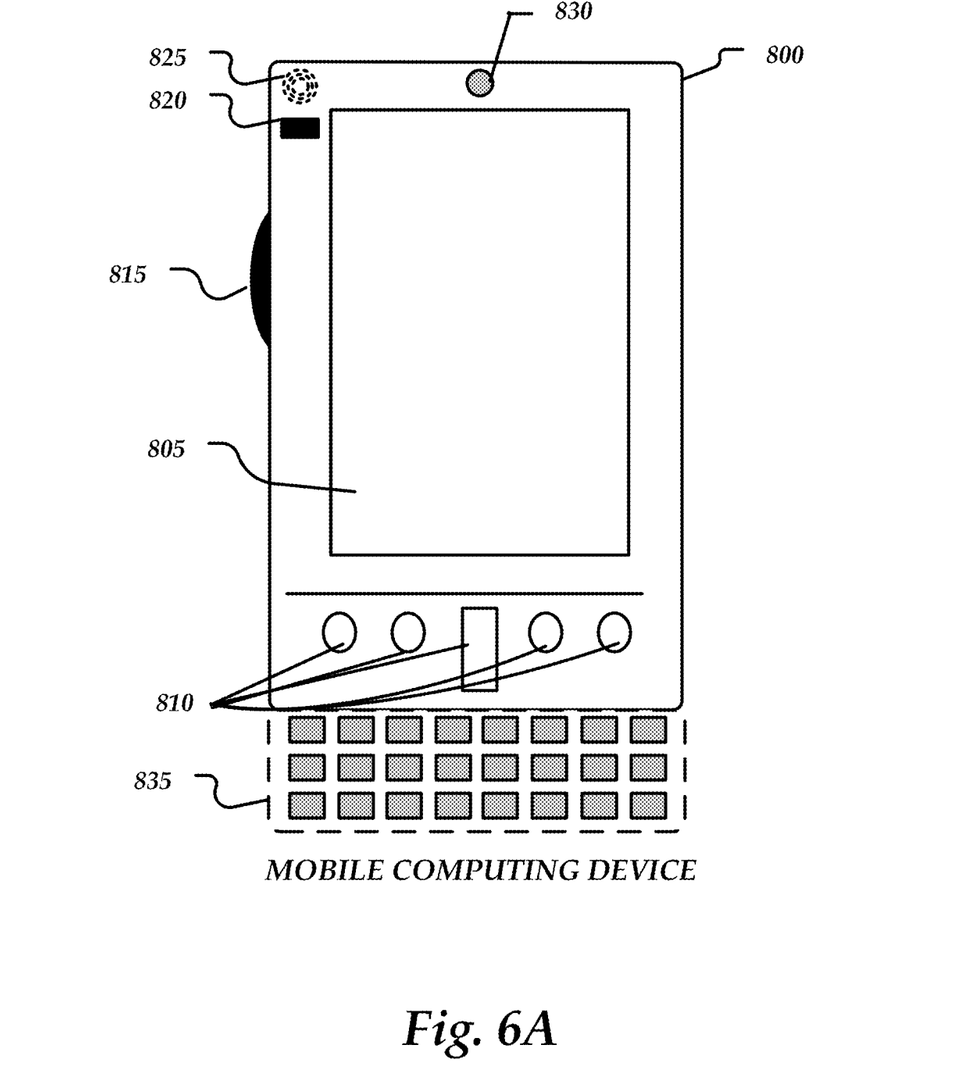
Figure 6B:
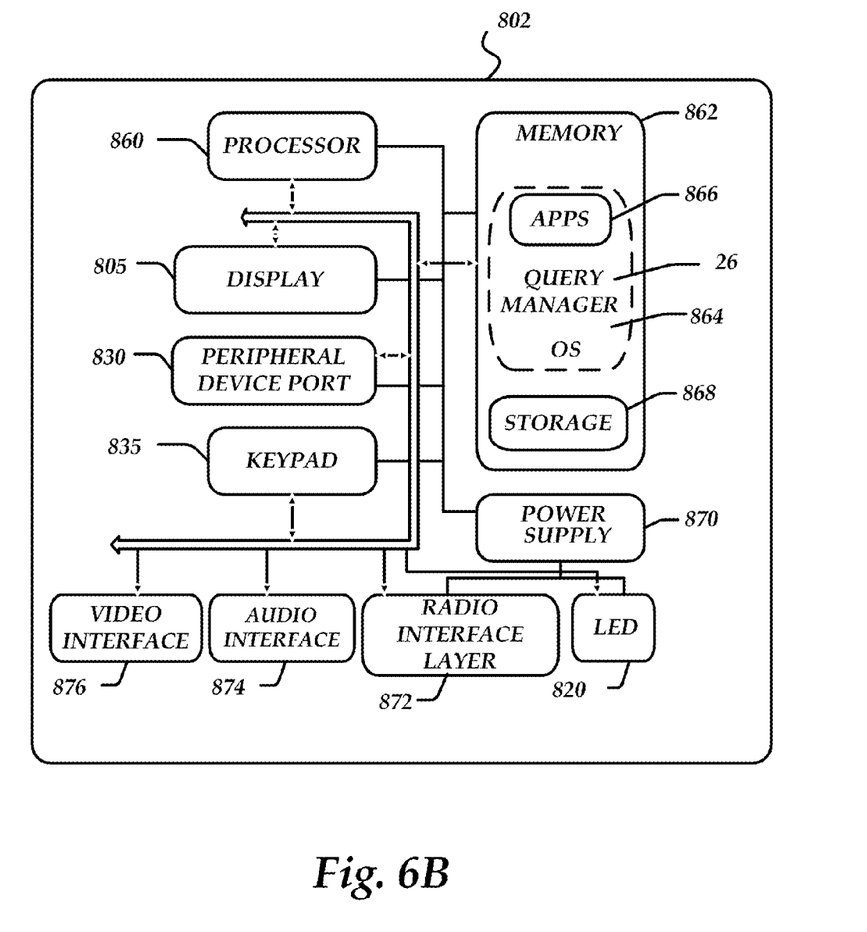
Figure 7:
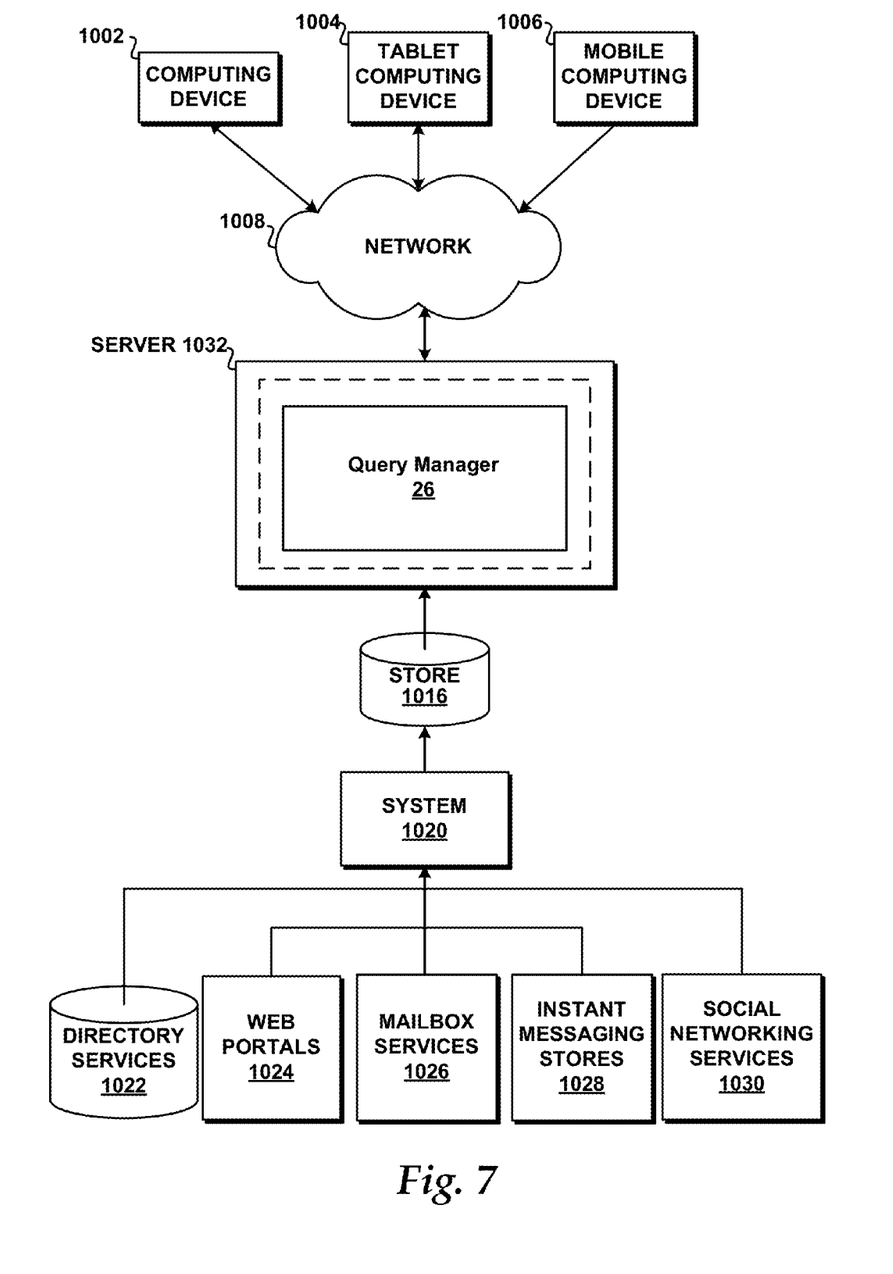

FIGS. 5-7 and the associated descriptions provide a discussion of a variety of operating environments in which embodiments of the invention may be practiced. However, the devices and systems illustrated and discussed with respect to FIGS. 5-7 are for purposes of example and illustration and are not limiting of a vast number of computing device configurations that may be utilized for practicing embodiments of the invention, described herein.

FIG. 5 is a block diagram illustrating example physical components of a computing device 500 with which embodiments of the invention may be practiced. The computing device components described below may be suitable for the computing devices described above. In a basic configuration, computing device 500 may include at least one processing unit 702 and a system memory 704. Depending on the configuration and type of computing device, system memory 704 may comprise, but is not limited to, volatile (e.g. random access memory (RAM)), non-volatile (e.g. read-only memory (ROM)), flash memory, or any combination. System memory 704 may include operating system 705, one or more programming modules 706, and may include a web browser application 720. Operating system 705, for example, may be suitable for controlling computing device 500's operation. In one embodiment, programming modules 706 may include a query manager 26, as described above, installed on computing device 500. Furthermore, embodiments of the invention may be practiced in conjunction with a graphics library, other operating systems, or any other application program and is not limited to any particular application or system. This basic configuration is illustrated in FIG. 5 by those components within a dashed line 708.

Computing device 500 may have additional features or functionality. For example, computing device 500 may also include additional data storage devices (removable and/or non-removable) such as, for example, magnetic disks, optical disks, or tape. Such additional storage is illustrated in FIG. 5 by a removable storage 709 and a non-removable storage 710.

As stated above, a number of program modules and data files may be stored in system memory 704, including operating system 705. While executing on processing unit 702, programming modules 706, such as the query manager may perform processes including, for example, one or more methods 300 and 400 as described above. The aforementioned process is an example, and processing unit 702 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the manager 26 may be operated via application-specific logic integrated with other components of the computing device/system 500 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. System memory 704, removable storage 709, and non-removable storage 710 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 500. Any such computer storage media may be part of device 500. Computing device 500 may also have input device(s) 712 such as a keyboard, a mouse, a pen, a sound input device, a touch input device, etc. Output device(s) 714 such as a display, speakers, a printer, etc. may also be included. The aforementioned devices are examples and others may be used.

A camera and/or some other sensing device may be operative to record one or more users and capture motions and/or gestures made by users of a computing device. Sensing device may be further operative to capture spoken words, such as by a microphone and/or capture other inputs from a user such as by a keyboard and/or mouse (not pictured). The sensing device may comprise any motion detection device capable of detecting the movement of a user. For example, a camera may comprise a MICROSOFT KINECT® motion capture device comprising a plurality of cameras and a plurality of microphones.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 6A and 6B illustrate a suitable mobile computing environment, for example, a mobile telephone, a smartphone, a tablet personal computer, a laptop computer, and the like, with which embodiments of the invention may be practiced. With reference to FIG. 6A, an example mobile computing device 800 for implementing the embodiments is illustrated. In a basic configuration, mobile computing device 800 is a handheld computer having both input elements and output elements. Input elements may include touch screen display 805 and input buttons 815 that allow the user to enter information into mobile computing device 800. Mobile computing device 800 may also incorporate an optional side input element 815 allowing further user input. Optional side input element 815 may be a rotary switch, a button, or any other type of manual input element. In alternative embodiments, mobile computing device 800 may incorporate more or less input elements. For example, display 805 may not be a touch screen in some embodiments. In yet another alternative embodiment, the mobile computing device is a portable phone system, such as a cellular phone having display 805 and input buttons 815. Mobile computing device 800 may also include an optional keypad 835. Optional keypad 815 may be a physical keypad or a "soft" keypad generated on the touch screen display.

Mobile computing device 800 incorporates output elements, such as display 805, which can display a graphical user interface (GUI). Other output elements include speaker 825 and LED light 820. Additionally, mobile computing device 800 may incorporate a vibration module (not shown), which causes mobile computing device 800 to vibrate to notify the user of an event. In yet another embodiment, mobile computing device 800 may incorporate a headphone jack (not shown) for providing another means of providing output signals.

Although described herein in combination with mobile computing device 800, in alternative embodiments the invention is used in combination with any number of computer systems, such as in desktop environments, laptop or notebook computer systems, multiprocessor systems, micro-processor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present invention.

FIG. 6B is a block diagram illustrating components of a mobile computing device used in one embodiment, such as the computing device shown in FIG. 6A. That is, mobile computing device 800 can incorporate system 802 to implement some embodiments. For example, system 802 can be used in implementing a "smart phone" that can run one or more applications similar to those of a desktop or notebook computer such as, for example, browser, e-mail, scheduling, instant messaging, and media player applications. In some embodiments, system 802 is integrated as a computing device, such as an integrated personal digital assistant (PDA) and wireless phone.

One or more application programs 866 may be loaded into memory 862 and run on or in association with operating system 864. Examples of application programs include phone dialer programs, e-mail programs, PIM (personal information management) programs, word processing programs, spreadsheet programs, Internet browser programs, messaging programs, and so forth. System 802 also includes non-volatile storage 868 within memory 862. Non-volatile storage 868 may be used to store persistent information that should not be lost if system 802 is powered down. Applications 866 may use and store information in non-volatile storage 868, such as e-mail or other messages used by an e-mail application, and the like. A synchronization application (not shown) may also reside on system 802 and is programmed to interact with a corresponding synchronization application resident on a host computer to keep the information stored in non-volatile storage 868 synchronized with corresponding information stored at the host computer. As should be appreciated, other applications may be loaded into memory 862 and run on the device 800, including the query manager 26, described above.

System 802 has a power supply 870, which may be implemented as one or more batteries. Power supply 870 might further include an external power source, such as an AC adapter or a powered docking cradle that supplements or recharges the batteries.

System 802 may also include a radio 872 that performs the function of transmitting and receiving radio frequency communications. Radio 872 facilitates wireless connectivity between system 802 and the "outside world", via a communications carrier or service provider. Transmissions to and from radio 872 are conducted under control of OS 864. In other words, communications received by radio 872 may be disseminated to application programs 866 via OS 864, and vice versa.

Radio 872 allows system 802 to communicate with other computing devices, such as over a network. Radio 872 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 802 is shown with two types of notification output devices; LED 820 that can be used to provide visual notifications and an audio interface 874 that can be used with speaker 825 to provide audio notifications. These devices may be directly coupled to power supply 870 so that when activated, they remain on for a duration dictated by the notification mechanism even though processor 860 and other components might shut down for conserving battery power. LED 820 may be programmed to remain on indefinitely until the user takes action to indicate the powered-on status of the device. Audio interface 874 is used to provide audible signals to and receive audible signals from the user. For example, in addition to being coupled to speaker 825, audio interface 874 may also be coupled to a microphone 820 to receive audible input, such as to facilitate a telephone conversation. In accordance with embodiments of the present invention, the microphone 820 may also serve as an audio sensor to facilitate control of notifications, as will be described below. System 802 may further include video interface 876 that enables an operation of on-board camera 830 to record still images, video stream, and the like.

A mobile computing device implementing system 802 may have additional features or functionality. For example, the device may also include additional data storage devices (removable and/or non-removable) such as, magnetic disks, optical disks, or tape. Such additional storage is illustrated in FIG. 6B by storage 868. Computer storage media may include volatile and nonvolatile, removable and non-removable media implemented in any method or technology for storage of information, such as computer readable instructions, data structures, program modules, or other data.

Data/information generated or captured by the device 800 and stored via the system 802 may be stored locally on the device 800, as described above, or the data may be stored on any number of storage media that may be accessed by the device via the radio 872 or via a wired connection between the device 800 and a separate computing device associated with the device 800, for example, a server computer in a distributed computing network such as the Internet. As should be appreciated such data/information may be accessed via the device 800 via the radio 872 or via a distributed computing network. Similarly, such data/information may be readily transferred between computing devices for storage and use according to well-known data/information transfer and storage means, including electronic mail and collaborative data/information sharing systems.

FIG. 7 illustrates a system architecture for using popular queries to decide when to federate queries, as described above.

Components managed via the query manager 26 may be stored in different communication channels or other storage types. For example, components along with information from which they are developed may be stored using directory services 1022, web portals 1024, mailbox services 1026, instant messaging stores 1028 and social networking sites 1030. The systems/applications 26, 1020 may use any of these types of systems or the like for enabling management and storage of components in a store 1016. A server 1032 may provide communications for managed components and content to clients. As one example, server 1032 may be a web server providing collaborative display component management communications and content over the web. Server 1032 may provide online display component management and content over the web to clients through a network 1008. Examples of clients that may obtain display component management communications and content include computing device 1002, which may include any general purpose personal computer, a tablet computing device 1004 and/or mobile computing device 1006 which may include smart phones. Any of these devices may obtain display component management communications and content from the store 1016.

Embodiments of the present invention are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method executing on one or more processors for federating a query to other result sources, comprising:
  obtaining a query to be executed by an enterprise search application to obtain search results from a result source;
  for each of a plurality of additional result sources:
  determining a probability of the query occurring in the additional result source comprising determining a frequency of the query occurring in the additional result source and examining a query log to determine the probability of the query occurring in the additional result source, wherein the query log includes executed queries that comprise a query, query parameters for the query, query results and user interactions with the query results;
  executing the query in the additional result source based on a determination using the probability; and
  receiving additional results from the execution of the query using the additional result source; and displaying the results from the result source with each of the additional results.

2. The method of claim 1, further comprising comparing a first probability of the query in the result source with the probability of the query occurring in the additional result source.

3. The method of claim 1, further comprising determining when a probability of an altered query of the query occurring in the additional result source exceeds an altered query threshold.

4. The method of claim 1, further comprising determining a popularity of clicked queries in the additional result sources and executing the query in the additional result source based in part on the popularity.

5. The method of claim 1, further comprising obtaining at least a portion of popular queries from each of the additional result sources.

6. The method of claim 1, wherein the query log stores user clicks with the query results.

7. The method of claim 6, wherein the query log identifies a search application executing each query.

8. The method of claim 1, wherein displaying the results from the result source with each of the additional results comprises obtaining at least one of: a predetermined number of the additional results obtained from each of the additional result sources queried and a predetermined proportion of the additional results obtained from each of the additional result sources queried.

9. The method of claim 1, wherein the plurality of the additional result sources comprise different enterprise result sources.

10. A computer-readable memory having computer-executable instructions for federating a query to other result sources, comprising:
obtaining a query to be executed by a search application to obtain search results from a result source;
for each of a plurality of additional result sources:
altering the query to change a scope of the query when determined;
determining a probability comprising determining a frequency of the query occurring in the additional result source using a query log that is associated with the additional result source and includes executed queries that comprise a query, query parameters for the query, query results and user interactions with the query results;
executing the query in the additional result source based on a determination using the probability; and
receiving additional results from the execution of the query using the additional result source; and
displaying the results from the result source with each of the additional results.

11. The computer-readable medium of claim 10, wherein determining the popularity of the query in the additional result source comprises using a first probability of the query in the result source and a second probability of the query in the additional result source.

12. The computer-readable medium of claim 11, further comprising storing user clicks with the query results in the query log.

13. The computer-readable medium of claim 10, wherein altering the query comprises at least one of: determining rules configured by a user of an enterprise search service that are triggered in response to receiving the query and determining a context from the query and the result source.

14. The computer-readable memory of claim 10, wherein the query log identifies a search application executing each query.

15. The computer-readable medium of claim 10, wherein displaying the results from the result source with each of the additional results comprises obtaining a portion of the additional results obtained from each of the additional result sources queried.

16. The computer-readable medium of claim 10, wherein the plurality of the additional result sources comprise different enterprise result sources.

17. A system for federating a query to other result sources, comprising:
a network connection that is coupled to tenants of a multi-tenant service;
a processor and a computer-readable memory;
an operating environment stored on the computer-readable memory and executing on the processor;
a search application that is associated with a primary result source;
additional result sources; and
a query manager operating under the control of the operating environment and operative to:
obtaining a query to be executed by the search application to obtain search results from the primary result source;
for each of the additional result sources:
altering the query to change a scope of the query when determined;
determining a probability comprising determining a frequency of the query occurring in the additional result source using a query log that is associated with the additional result source and includes executed queries that comprise a query, query parameters for the query, query results and user interactions with the query results;
executing the query in the additional result source based on a determination using the probability; and
receiving additional results from the execution of the query using the additional result source; and
displaying the results from the result source with each of the additional results.

18. The system of claim 17, further comprising comparing a first probability of the query in the result source with a second probability of the query in the additional result source.

19. The system of claim 17, wherein determining the probability of the query occurring in the additional result source using the query log that is associated with the additional result source comprises altering the query before determining the probability in the query log.

20. The system of claim 17, wherein the query log stores user clicks with the query results.

* * * * *